Dec. 5, 1933.   L. BOIRAULT   1,937,683
AUTOMATIC ADJUSTING DEVICE FOR BRAKE MEMBERS
Filed July 22, 1929   5 Sheets-Sheet 1
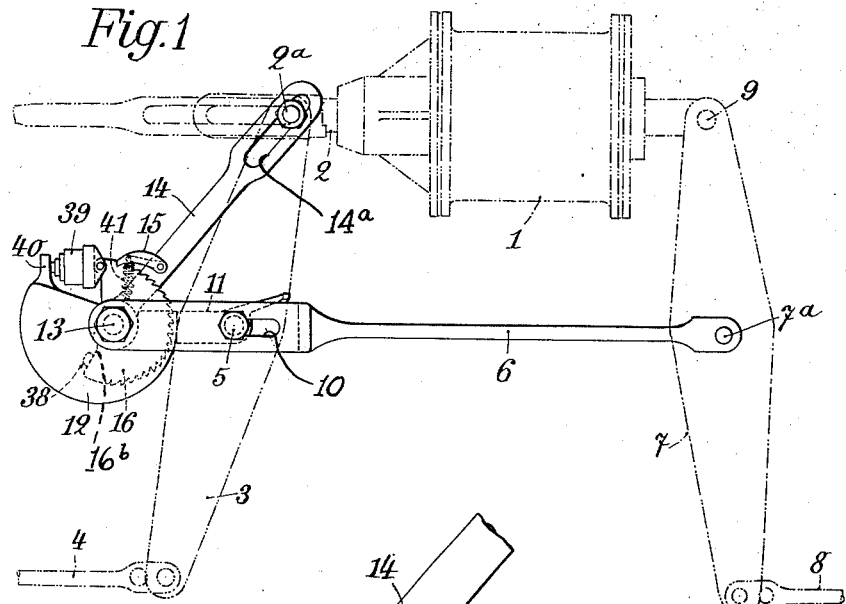
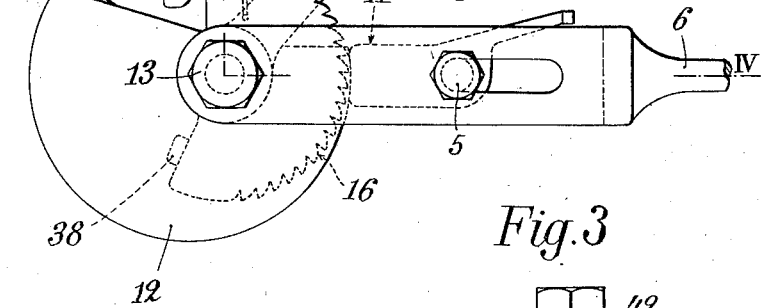
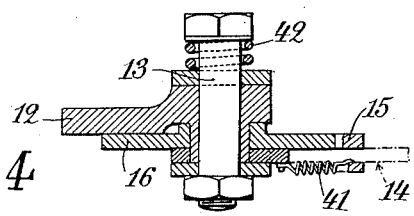
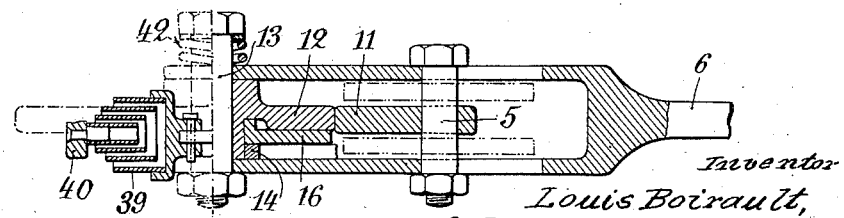
Inventor
Louis Boirault,
by H. B. Willson & Co
Attorneys Dec. 5, 1933.　　　　　L. BOIRAULT　　　　　1,937,683
AUTOMATIC ADJUSTING DEVICE FOR BRAKE MEMBERS
Filed July 22, 1929　　　5 Sheets-Sheet 2
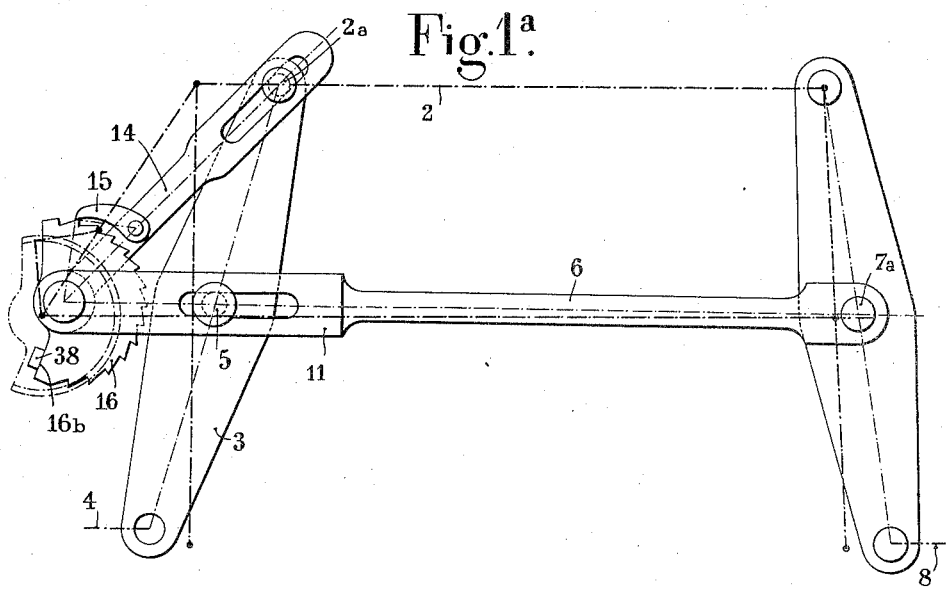
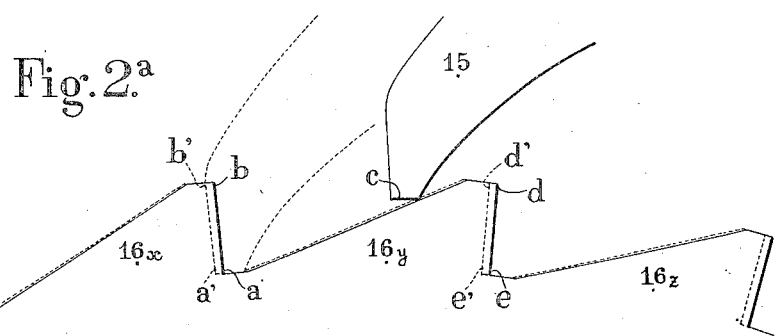
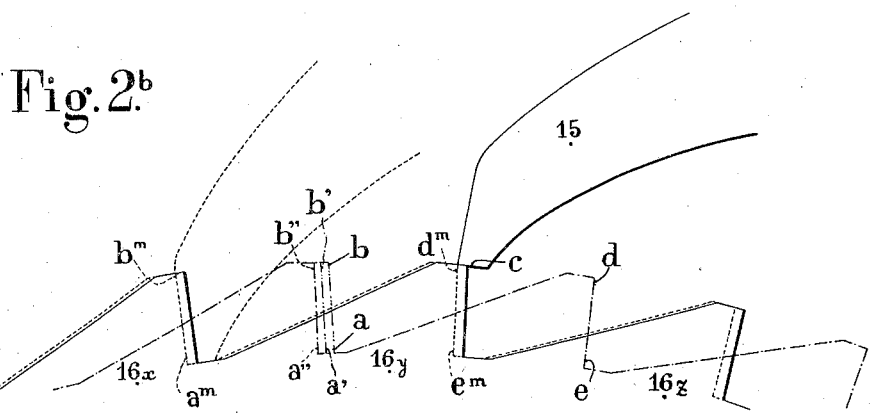
Inventor
L. Boirault
H. R. Willson & Co
Attorneys Dec. 5, 1933.   L. BOIRAULT   1,937,683
AUTOMATIC ADJUSTING DEVICE FOR BRAKE MEMBERS
Filed July 22, 1929   5 Sheets-Sheet 3
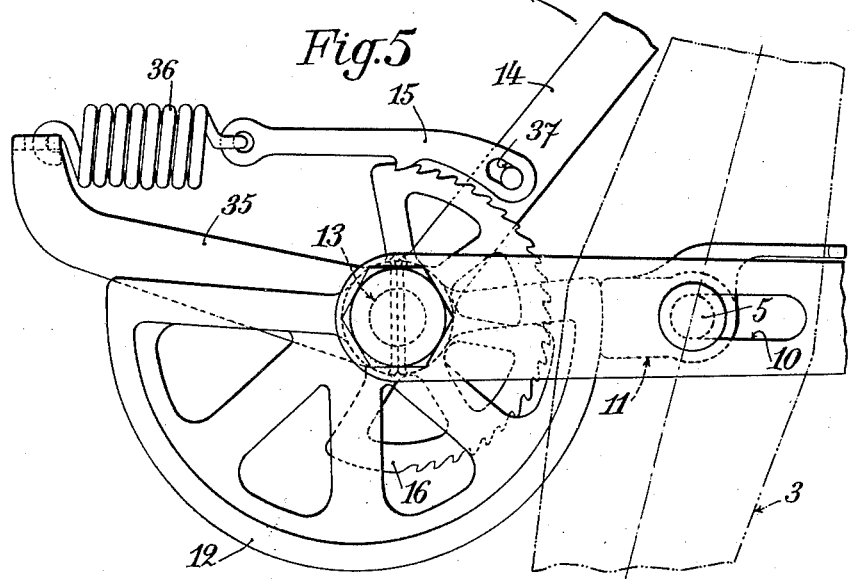
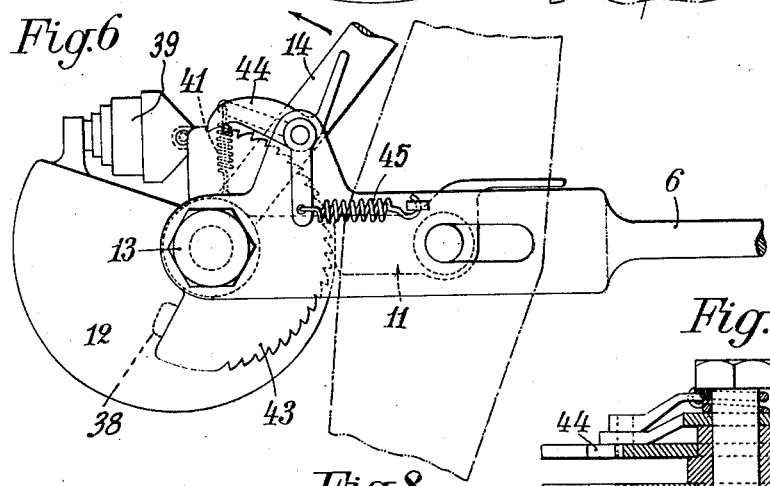
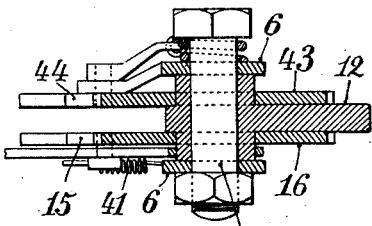
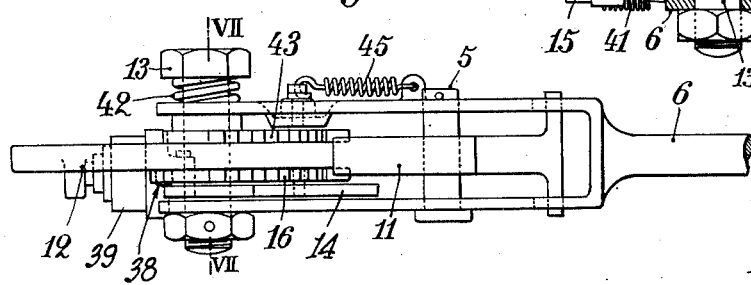
Inventor
Louis Boirault,
by H. B. Willson & Co.
Attorneys Dec. 5, 1933.   L. BOIRAULT   1,937,683
AUTOMATIC ADJUSTING DEVICE FOR BRAKE MEMBERS
Filed July 22, 1929   5 Sheets-Sheet 4
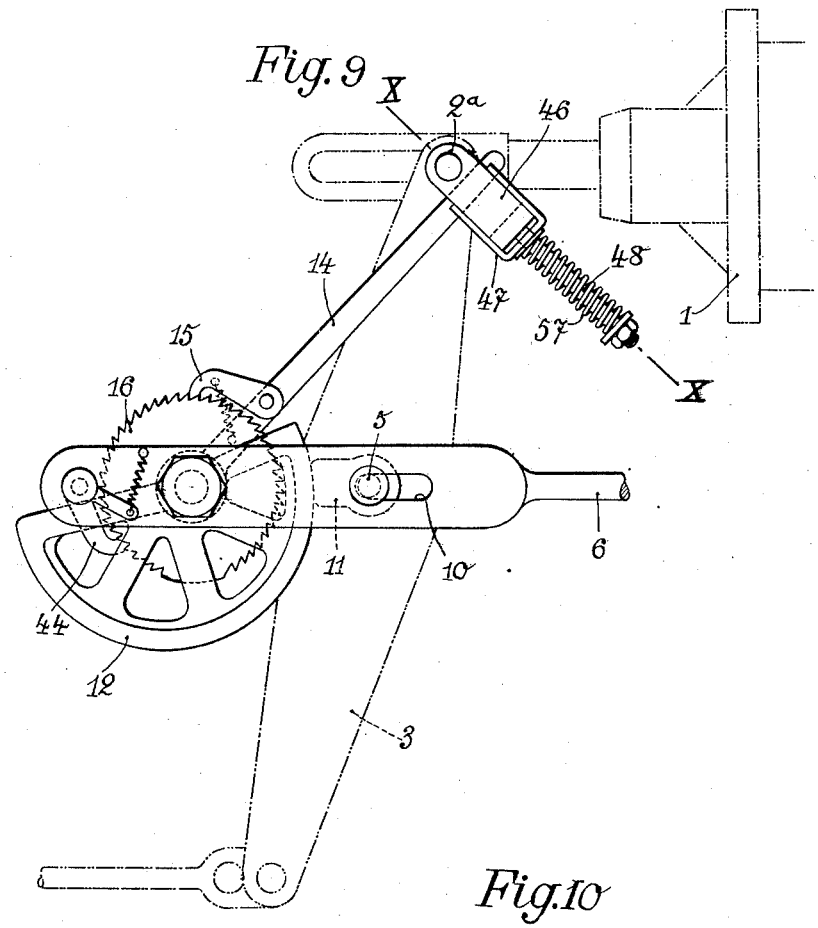
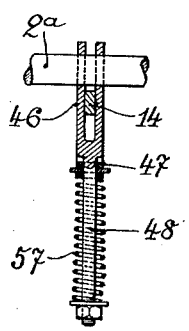
Inventor
Louis Boirault,
By H. B. Willson & Co
Attorneys

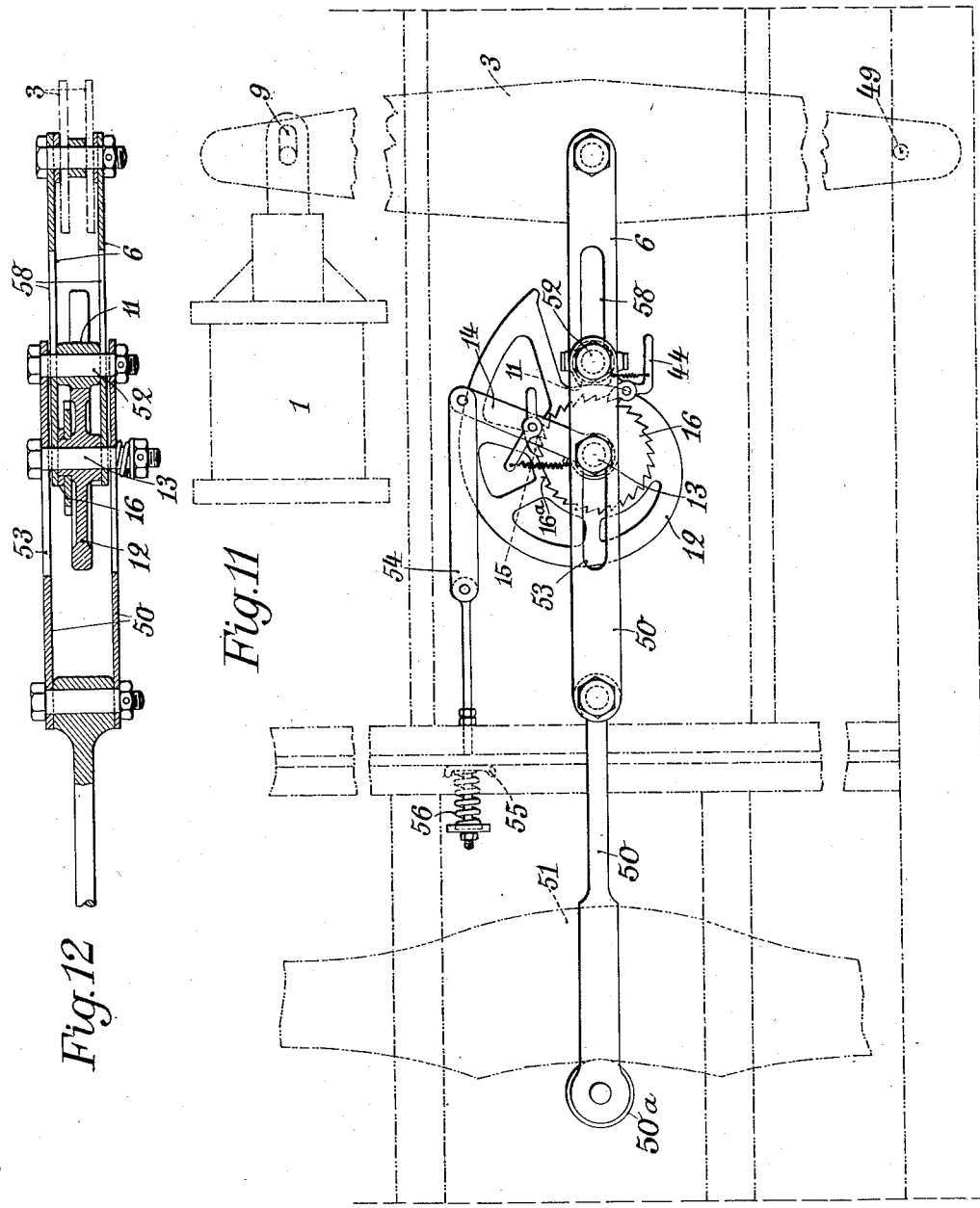

Patented Dec. 5, 1933

1,937,683

UNITED STATES PATENT OFFICE

1,937,683

AUTOMATIC ADJUSTING DEVICE FOR BRAKE MEMBERS

Louis Boirault, Paris, France

Application July 22, 1929, Serial No. 380,187, and in France December 8, 1928

8 Claims. (Cl. 188—198)

The present invention has for its object a device functioning to automatically take up the wear, in proportion as it takes place, of braking members, more particularly relating to railway vehicles.

This device is based on the fact that the wear of the brake shoes increases the play existing between the latter and the wheels when the brake is released, so that the displacement of all the movable parts of the brake, upon application of the brake shoes on the wheels, increases in proportion as the wear is greater.

According to this invention, use is made of the displacement of any of the members of the control device of the brake shoe for automatically actuating, every time the increase of displacement of this member reaches a predetermined limit, a ratchet take up device which modifies the length of this member so as to reduce accordingly the play between the latter and the wheel.

For protecting the parts against shocks in case of additional stroke of the piston, resulting for instance from the resilient distortion of the rigging once the shoes are pressed against the wheels, a resilient device is interposed in the ratchet wear taking up device.

The apparatus in accordance with the invention avoids the necessity of executing by hand the taking up of the wear of the brake shoes, which operation, particularly on railways, must be frequently effected and causes a loss of time and increasing operating expenses.

The accompanying drawings illustrate, by way of example, various forms of carrying out the subject-matter of the invention.

Figs. 1 to 4 illustrate a first form of construction of the device.

Fig. 1 is a plan view of the entire brake control device provided with the wear take up device in accordance with the invention.

Fig. 1a is a diagram indicating the displacement of the members controlling the rotation of the slack take-up cam.

Fig. 2 is a plan view, on an enlarged scale, of the wear take-up device alone.

Fig. 2a shows, on an enlarged scale, the displacements of the pawl on a ratchet segment rigid with the cam, when the play of the brake shoes is such that the nose of the pawl does not fall on another tooth at the end of its return movement.

Fig. 2b shows the positions of the same members at the beginning and at the end of their movement when the play of the brake shoes has been increased to such an extent that the nose of the pawl will fall on another tooth at the end of its return movement.

Fig. 3 is a cross section thereof through the axis of a cam.

Fig. 4 is a sectional plan taken on line IV—IV of Fig. 2.

Fig. 5 is a partial plan view similar to Fig. 2 and relating to a modification.

Figs. 6 to 8 illustrate another modification.

Fig. 6 is a top plan view of the device.

Fig. 7 is a cross vertical section thereof, made according to line VII—VII of Fig. 8.

Fig. 8 is a front elevation thereof.

Figs. 9 and 10 illustrate another device in plan view and in section according to line X—X of Fig. 9, respectively.

Figs. 11 and 12 are similar views of a modification.

In these figures, the wheels and brake shoes have not been shown, but only a portion of the riggings and the operating members between the brake cylinder and these riggings have been illustrated.

In Figs. 1 to 4, 1 designates the brake cylinder and 2 the rod of the operating piston movable in this cylinder.

This rod acts, through the medium of a brake lever 3, on a link 4 which actuates by a pull the brakes associated with one of the axles of the car.

This brake lever is, further, connected, by a pin 5, a rod or link 6 and a beam 7; to a link 8 actuating the brakes of the other axle.

The brake lever 7 oscillates about a fixed point 9. At the time of braking, when the rod 2 issues from the cylinder 1, the brake lever 3 begins to oscillate, for instance about its pivotal connection with the link 4, exerting a pull on the rod 6 and on the brake lever 7. When the brake shoes controlled by the link 8 are applied on the corresponding wheels, the brake lever 7 becomes stationary the pin 5 becomes fixed, and then the brake lever 3 continuing to oscillate, pulls the link 4, so that the respective brake shoes connected to the latter are also applied to the wheels with which they are associated and as a result the braking stresses are equalized on all the brake shoes.

The pin 5 extends through slots 10 provided in the forked end of the rod 6, and it extends, also through a wedging member 11 which bears on a cam 12 rotating on an axis 13 carried by the fork.

A rotation of the cam 12 moves the member 11 and, consequently, the pin 5 relatively to the rod 6 and to its pivotal connection 7a with the brake lever 7; this is equivalent to a reduction of the length of the compound connecting rod 6, 12, 11, and takes up for the wear of the shoes and the joints or the riggings.

On the axis 2a connecting the rod 2 to the brake lever 3 is pivoted a lever 14 which is journalled on the hub of the cam 12.

A mortise 14a is provided in the lever 14 for the passage of the bolt 2a, in order to allow the distortion of the triangle constituted by the brake lever 3, link and lever 14.

This lever carries a pawl 15 in engagement with a segmental ratchet 16 mounted on the axis 13, and this ratchet abuts against a boss 38 of the cam, under the action of a spring 39 bearing on an extension 40 of this cam, so that the ratchet can drive the cam through the medium of the spring 39.

The pawl 15 is pressed against the teeth of the ratchet by a spring 41; in this way, there is no danger of this pawl disengaging, even if it is worn, or if the teeth of the ratchet are worn.

Owing to the interposition of the spring 39, the piston can, without prejudice to the apparatus, move over the additional distance due to the resilient distortion of the rigging; once the shoes are applied on the wheels, the spring 39 is compressed, whilst the cam remains stationary.

A spring 42, arranged on the axis 13, produces a clamping and a friction between the various parts mounted on this axis; its strength is so adjusted that the pressure is sufficient for preventing any untimely rotation of the cam, upon release of the brake, under the action of the friction of the nose of the pawl, when the latter moves back on one of the teeth of the ratchet, but this pressure is sufficiently low in order that the friction created be consistent with the proper operation of the apparatus.

In fact, too strong a pressure, providing a friction which could not be overcome by the action of the spring 39, would prevent the operation of the apparatus.

The operation takes place as follows:

At rest, the members 3, 6, 7, 14, 15 are in the position indicated in full lines in Fig. 1a; the brake shoes (not shown) are spaced from the wheels.

When the brake cylinder acts for determining a braking action, its piston moves towards the left and the joint 2a operates the brake lever 3. If it is assumed that the pivot 5 first remains stationary, the brake lever rocks about 5 and pulls the rod 4 towards the right, until the respective brake shoes are pressed on the wheels; from this moment, the brake lever 3 rocks about its point of attachment to the rod 4 and pulls the link 6 towards the left; through the medium of the brake lever 7, the link 8 is pulled towards the left and presses the respective brake shoes on the wheels. At this moment, the piston again slightly moves towards the left as much as is permitted by the resiliency of all the transmission members while the brake shoes are tightly applied; the final positions of the members are indicated in dotted lines in Fig. 1a. For instance, for a stroke of about 125 millimeters of the piston, corresponding to a normal play of the brake shoes, the lever 14 rocks according to an angle of about 10° relatively to the connecting rod and the pawl 15 rocks according to the same angle relatively to the ratchet wheel 16. Consequently, the teeth of this wheel are given an angular pitch slightly greater than 10°, for instance 11 or 12°.

For greater clearness, Figs. 2a, 2b show an initial angular movement of the pawl smaller than it really is.

During the previous breaking operation, the nose of the pawl 15 had moved forward the abrupt flank of a tooth 16x up to the position $a\ b$, and upon release of the brakes, the nose of the pawl had moved backwards on the tooth 16y up to the position $c$ indicated in Fig. 2a, the ratchet segment 16 remaining stationary relatively to the link 6 during this backward movement, owing to the pressure produced by the spring 42.

During the present braking movement, the pawl 15 moves forward towards the left according to an extent slightly greater than its preceding movement owing to the slight wear of the brake shoes which occurs at each braking action; it therefore pushes the flank of the tooth 16x from the position $a\ b$ to the position $a'\ b'$, which, in fact, is extremely near the previous position $a\ b$; the angular distance $a\ a'$ is a small fraction of the initial distance $c\ d$ separating the nose of the pawl from the point $d$ of the tooth 16y.

Upon release, the nose of the pawl 15 comes back very approximately to its initial position of rest $c$, but the distance from this nose to the top $d$ of the tooth 16y has however slightly diminished, the flank $d\ e$ of this tooth having been moved forward to $d'\ e'$ owing to the above mentioned rotation $a\ a'$ due to the wear of the brake shoes produced during the braking action.

Owing to the rotation $a\ a'$ of the ratchet segment 16 and of the cam 12 which is rigid therewith, the length of the link 6, that is to say the distance 5, 7a, has been diminished to a very small extent $\Sigma$ corresponding to the increase of the radius of the cam and too small for compensating the wear of the brake shoes.

During the following braking actions, the stroke of the piston, brake levers, lever 14 and pawl 15 gradually increases, so that the flank $a\ b$ of the tooth 16x is gradually pushed from $a'\ b'$ to $a''\ b''$, to $a'''\ b'''$ (Fig. 2b) and finally to $a^m\ b^m$, which position is such that the top of the tooth 16y extends slightly beyond the position of rest $c$ of the nose of the pawl. It results therefrom that, upon respective release of the brake, the nose of the pawl will fall on to the following tooth 16z.

At this moment, the length 5, 7a of the link 6 has already been shortened according to an extent $\Sigma\ \epsilon$ corresponding to the increase of radius of the cam for the angular advance according to an angle $a\ a^m$ of the latter.

Upon the following application of the brakes, the pawl 15 will push the flank of the tooth 16y approximately up to the position $a\ b$ occupied at the beginning by the flank of the tooth 16x, so that the total angular advance of the ratchet segment and of the cam then corresponds to the angular pitch $a\ e$ of the teeth of the ratchet. This causes a sudden shortening of the length 5, 7a of the link 6, which is added to the previous shortenings $\Sigma\ \epsilon$, and this total shortening, which is function of the pitch of the wheel 16 and of the profile of the cam 12, is such that the wear of the brake shoes is at this moment compensated as exactly as possible.

From this moment, the operation will take place over again as above stated, the pawl, now sliding on the tooth 16z instead of sliding on the tooth 16y and so on.

It is to be noted that the stroke or movement of the pawl 15, when it pushes the flank of the tooth 16y from the position $d^m\ e^m$, is shorter than the previous movement of the same pawl (from $c$ to $a^m$), because, during this new movement, the cam 12 rotates and at the same time reduces the play, so that the nose of the pawl stops in the position $a$ instead of moving up to $a^m$.

In the above description of the operation, the supplementary stroke of the piston corresponding to the resiliency of the transmission members has not been taken into consideration. In fact, this does not in any way influence the rotation of the cam 12 and the adjustment of the link 6, because, upon application of the brakes, the rotation of the cam is prevented by the friction of the member 11 as soon as the brake shoes are firmly pressed upon the wheels, and the subsequent resilient distortion of the rigging has no other action than that of compressing the spring 39 to a certain extent, the edge 16b of the ratchet segment 16 then moving away from the projection 38 of the cam. The pawl 15 thus moves the flank of the tooth $16x$ for instance beyond the previously indicated position $a'$ $b'$ or $a''$ $b''$, etc.; but, at the beginning of the release of the brakes, the spring 39 relaxes and brings back the ratchet segment 16 in contact with the projection 38 of the cam, precisely at the point indicated in the operation described above, before the cam 12 ceases to be firmly held stationary by the friction of the member 11. The teeth $16x$, $16y$ therefore resume at every time the progressive positions above defined, such as $a'$ $b'$, $a''$ $b''$ ... $a^m$ $b^m$, and the respective positions of the pawl 15 relatively to the teeth are not modified.

The resilient device serving to absorb the complementary stroke of the piston after application of the brake shoes on the wheels can be arranged at different places of the series of parts 14, pawl 15, segment 16, cam 12, piston rod 2. It can be arranged not only as shown at 39 (Fig. 1) between the ratchet segment and the cam, but also between the lever and the pawl, or between the piston rod 2 and the lever, as will be seen hereinafter. In any case, the operation of the play take up members remains identical to that described above in detail.

In the modification illustrated in Fig. 5, the lever 14 is integral with an arm 35, and a powerful spring 36 is interposed between this end and the pawl 15. The latter is guided by an oval eye 37 on an axis secured to the lever 14. The cam 12 is integral with the ratchet 16.

When the lever rocks in the direction of the arrow (Fig. 5) under the thrust of the brake piston, its arm 35 pulls the pawl through the medium of the spring 36, so that this pawl can drive the segmental ratchet 16 and consequently the cam 12 connected thereon only with a limited force and does not risk being broken and of causing the rupture of another member at the time the application of the brake shoes on the wheels suddenly stops the rotation of the cam 12.

The operation of the said device is as follows:

When the brake piston moves on, the brake lever 3 is operated as in the case of Figs. 1 to 4 and transmits the tractive effort to the rods or links of the rigging in the same manner. The lever 14, also driven by the piston rod, exerts through the medium of its extension 35, a pull upon the spring 36 which transmits the said tractive effort resiliently to the pawl 15 pressed against the teeth of the ratchet wheel 16.

The said spring, instead of being interposed between the ratchet and the cam as such is the case in Figs. 1 and 4, is interposed here between the lever 14 and the pawl 15; the ratchet is then rigidly connected to the cam. However the said arrangement does not alter in any way the general operation such as it has been described with reference to Figs. 1 to 4.

The modification illustrated in Figs. 6 to 8, differs from the first form of construction by the addition of a safety device serving to prevent any accidental loosening of the cam, in case the pawl 15 would cease to act for any reason whatever: damage, breaking of the spring 41, etc.

For that purpose, a second segmental ratchet 43 is rigidly secured to the cam 12 while the ratchet 16 is mounted as in Figs. 1 to 4 in the teeth of this ratchet 43 enters a pawl 44 mounted on the end of the connecting rod 6.

This pawl 44 is pressed against the wheel 43 by a spring 45 and absolutely prevents the cam 12 from moving backward in case the pawl 15 would no longer act on the segment 16. The ratchet 16 is separately rotated by means of an abutment 38. The operation of this device for taking up the play owing to wear is exactly the same as that of the device according to Figs. 1 to 4. The pawl 15 pivoted to the lever 14 is movable with the latter and if it strikes against the back face of a tooth, it drives the ratchet wheel 16 when the piston moves on; the ratchet 16 actuate then the cam 12 by means of the spring 39 as in the case of the Figs. 1 to 4; simultaneously the ratchet 43, secured to the cam 12 slides against the pawl 44 during the release of the brake; this pawl keeps the ratchet 43 and consequently the cam 12 from returning.

In Figs. 9 and 10, the ratchet 16 is rigidly secured to the cam 12, but the lever 14 is not positively driven by the axis $2a$; a resilient device is interposed between these two parts, so that, once the shoes are applied on the wheels, the piston can, as previously, move over the additional distance due to the resilient distortion of the rigging, without risk of breaking the pawl 15 or any other member.

For that purpose, the end of the lever 14 extends in a forked member 46 the branches of which are journalled on the axis $2a$.

A fork piece 47 can slide on the tail piece 48 of the member 46, in opposition to the action of a returning spring 57, and bears, by its suitably notched ends, on the lever 14.

It will be seen that if the axis $2a$ is urged to effect a stroke of greater extent than that normally provided for, the lever 14 can remain behind by bearing on the fork piece 47, whilst the spring 57 is compressed.

The said device is not different from those according to Figs. 1 to 5 as regards its operation; the spring 57 also allows the complementary stroke of the piston for applying the brakes, when the cam 12 once is locked. Instead of being interposed between the ratchet wheel and the cam as such is the case in Figs. 1 to 4, or between the lever 14 and the pawl 15 as such is the case in Fig. 5, the spring 57 according to Figs. 9 and 10, is interposed between the piston rod and the lever 14, but the general operation of the device, such as it has been hereinbefore described, is not thereby modified.

In the modification of Figs. 11 and 12, the lever 3 connected to the piston by the pin 9 at one of its ends, is pivoted at its other end at a fixed point 49. The connecting rod 6 connected to this lever, carries the spindle 13 of the cam 12 and ratchet 16 connected together.

Another conenncting rod 50—50 bears, through a roller $50a$ against a rocking lever 51, pivoted at its center, and at the end of which are pivotally connected the brake riggings (not shown). This connecting rod, which is in the shape of a fork, can slide on the connecting rod 6—6 and carries a stud 52 extending in grooves 58 of the said connecting rod.

On the other hand, the spindle 13 can move in grooves 53 of the connecting rod 50. The lever 14—14, carrying the pawl 15 and pivoted on the spindle 13 is connected, by a tie-rod 54, to a fixed part 55 of the framework, but with interposition of a spring 56 between the end of the rod and the part 55.

Under these conditions, the lever 14 can effect an additional angular movement by compressing the spring 56, without endangering the parts of the apparatus.

The operation of the said device is as follows:
When the tightening piston moves on, the brake lever 3, having as a fulcrum the axle 49, exerts a pull on the link 6, in thus shifting the axle 13 of the ratchet 16 and the cam 12 to the right on the drawings. The said axle being engaged in the slot 53 of the link 50, the latter is also urged to the right and consequently exerts a pulling strain or tractive effort upon the rigging of the brakes through the medium of the rocking lever or swing tree 51. But, the pawl-carrying lever 14 being retained at its free end, by the rod 54 and the spring 56, oscillates and the pawl 15 moves on but one tooth of the ratchet 16; when the said pawl has moved on sufficiently far to push a tooth, it causes the ratchet wheel 16 to rotate and consequently the cam 12, so that the axle 52, connected to the link 50, but sliding in the slot 58 of the link 6 is moved to the right in the drawing to an extent corresponding to the wear which is to be taken up.

As soon as the cam 12 cannot rotate any longer, the supplemental movement of the piston has for effect to push together the link 6 and the lever 14 to the right without further oscillation of this lever upon the bolt 13 so that the spring 56 is compressed.

At the release, the link 6 comes back to the left, the lever 14 comes back to its initial position and the pawl 15 slides backwards upon the tooth upon which it is pressed elastically.

It is to be noted that in all the above devices, it is desirable to provide, after the last tooth of the ratchet, a smooth space 16a greater than the maximum stroke of the pawl, so that the cam cannot be moved to a sufficient distance for allowing its most prominent end to extend beyond the bearing member 11 it controls.

This cam is preferably profiled as an Archimedes spiral, so that it determines a constant shortening of the composite connecting rod (6—11 or 6—11—50) for each angle of rotation of definite amplitude.

I claim:

1. Automatic adjusting device for front and rear car brakes, comprising two brake levers respectively connected to the riggings controlling the front and rear brakes, a brake piston rod connected to one of these brake levers, a link of adjustable length connecting the said brake levers, a cam adapted to vary the distance between the points of attachment of this link, an axle mounted on the said link and on which rotates the said cam, a ratchet segment mounted on the same axle, an abutment on the cam, against which bears the said segment, a spring between the said segment and a projection of the cam, a movable member the stroke of which becomes greater at the same time as the wear increases, and a pawl connected to the said movable member and adapted to actuate the said ratchet segment.

2. Automatic adjusting device for front and rear car brakes, comprising two brake levers respectively connected to the riggings controlling the front and rear brakes, a brake piston rod connected to one of these brake levers, a link of adjustable length connecting the said brake levers, a cam adapted to vary the distance between the points of attachment of this link, a lever oscillating about the axis of the cam and having a pawl adapted to drive the said cam, and a resilient device connecting the said lever to the brake piston rod.

3. Automatic adjusting device for brakes with shoes operates by a piston movable in a cylinder comprising a vehicle frame, a brake cylinder secured to the said frame, a piston rod, a first lever operated by the piston rod, a second lever, a rigging for driving the brake shoes operated by the said second lever, connecting means adapted to transmit the movement of the first lever to the second one in the direction corresponding to the blocking of the brakes, the said connecting means comprising an oscillating cam adapted to modify the distance between the said levers, and means for rotating the said cam, comprising a ratchet wheel adapted to drive along the said cam in its revolution, a lever pivoted on the axle of the said cam, a pawl on this latter lever for operating the said ratchet wheel in one direction, the said pawl-carrying lever being connected to one of the above mentioned elements so that it is caused to oscillate every time the piston rod causes the first mentioned lever to move and a spring acting upon one of the elements of the said means for rotating the cam, the said spring being adapted to yield when the rotation of the cam is prevented by the resistance to the two first levers when the same are to move the one relatively to the other.

4. Automatic adjusting device for brakes comprising two brake levers connected respectively to the riggings operating the front and rear brakes, a brake piston rod connected to one of the said brake levers, a connecting rod or link of an adjustable length connecting the two brake levers, a cam adapted to vary the length of the said link, a device for controlling the rotation of the said cam, comprising a lever oscillating about the axle of the cam, a pawl on the said lever adapted to drive along the said cam only in the direction of revolution of the said lever corresponding to the blocking of the brakes, and a resilient device interposed in the said cam controlling device.

5. Automatic adjusting device for brakes comprising two brake levers respectively connected to the riggings controlling the front and rear brakes, a brake piston rod connected to one of the said brake levers, a connecting rod or link of adjustable length connecting the two brake levers, a cam adapted to vary the length of the said link, a device for controlling the revolution of the said cam, comprising a lever oscillating about the axle of the cam, a pawl on the said lever adapted to drive along the said cam only in the direction of rotation of the said lever corresponding to the blocking of the brakes, and a device interposed in the said cam driving device, the said device being adapted to yield under a high predetermined effort.

6. Automatic adjusting device for brakes comprising two brake levers respectively connected to the riggings controlling the front and rear brakes, a brake piston rod connected to one of the said brake levers, a connecting rod or link of adjustable length connecting the two brake levers, a bolt secured to the said link, a cam mounted on the said bolt and adapted to vary the length of the said link, a device for controlling the rotation of the said cam, comprising a toothed sector mounted on the said bolt and capable of turning independently from the said cam, a spring pressing the said cam and the said sector the one against the other, a lever pivoted on the said axle, a pawl on the said lever adapted to drive the said toothed sector in the direction of rotation corresponding to the blocking of the brakes and a resilient device interposed in the said cam driving device.

7. Automatic adjusting device for brakes comprising two brake levers respectively connected to the riggings controlling the front and rear brakes, a brake piston rod connected to one of the said brake levers, a link of adjustable length adapted to vary the length of the said link, a lever oscillating about the axle of the cam, a pawl on the said lever adapted to drive along the said cam only in the direction of rotation of the said lever corresponding to the blocking of the brakes, a pawl mounted on the said link and adapted to prevent the cam from rotating backwardly and a resilient device interposed in the drive between the said piston rod and the said cam.

8. Automatic adjusting device for brakes with shoes operated by a piston movable in a cylinder, comprising a vehicle frame, a brake cylinder secured to the said frame, a piston rod, a first lever operated by the piston rod, a second lever, a rigging for controlling the brake shoes operated by the said second lever, connecting means adapted to transmit the movement of the first lever to the second one in the direction corresponding to the blocking of the brakes, the said connecting means comprising an oscillating cam adapted to modify the distance between the said levers, and means for rotating the said cam comprising a ratchet wheel adapted to drive along the said cam in its rotation, a lever pivoted on the axle of the said cam, a pawl on the latter lever for driving the said ratchet wheel in one direction, the said pawl-carrying lever being connected in a resilient manner to the vehicle frame.

LOUIS BOIRAULT.